Patented Dec. 2, 1930

1,783,364

UNITED STATES PATENT OFFICE

ROY H. KIENLE AND LESTER V. ADAMS, OF SCHENECTADY, NEW YORK, ASSIGNORS TO GENERAL ELECTRIC COMPANY, A CORPORATION OF NEW YORK

COATING COMPOSITION

No Drawing. Application filed January 29, 1927; Serial No. 164,661. Renewed April 9, 1930.

The present invention relates to the preparation of lacquer, varnish or other coating material from a resinous condensation product of a polyhydric alcohol and a polybasic acid.

When it is desired to suspend various fillers or pigments in solutions of resinous products of this class, for example, by grinding such materials to colloidal fineness in the presence of the resin solution, difficulties are sometimes encountered by a precipitation or coagulation of the filler or pigment.

We have discovered that this difficulty is due to the presence of free acid in the resin.

In accordance with our invention, the free acid in the resin is neutralized preliminary to the addition of the material to be suspended, and thereafter such material is suspended in the resin solution. Our invention, hence, also includes non-coagulating suspensions of mineral materials in resin solution.

The following illustrative example will explain our invention. The preparation of a resin of the above mentioned class (sometimes known as alkyd resin) from glycerine and phthalic anhydride may be carried out in accordance with the method described in U. S. Patents 1,108,329 and 1,108,330 issued to Michael J. Callahan on August 25, 1914. Other polyhydric alcohols and other polybasic acids may be caused to react to produce an alkyd resin.

Such a resin is likely to contain some uncombined organic acid, that is, phthalic acid in the case above mentioned, even when an excess of glycerine, or the like, has been employed in its preparation. In accordance with our invention this excess acid is removed by dissolving the resin in a suitable solvent, such as acetone, alcohol-benzol, glycol diacetate, ethyl, lactate, di-butyl phthalate, diethyl phthalate, benzyl acetate or glycol derivatives as the mono-ethyl ether, and treating the solution with an alkaline material consisting entirely or predominantly of alkaline-earth, such as unslaked lime, soda ash, soda lime or barium hydroxide. An excess of the alkaline material may be suspended in granular form in the solution, the suspension being agitated for a short time to permit neutralization to proceed sufficiently. Thereupon the clear solution is separated in any suitable manner, as by settling and decantation, from the compound of the alkali and the acid constituent of the resin and any excess of uncombined alkali which may be present.

Basic pigments, or fillers, such as zinc oxide, titanium oxide or basic lead carbonate may be suspended without coagulation in a solution of the resin after neutralization by grinding such mineral materials in the presence of the resin solution or by any other known method. Neutral pigments also may be suspended therein without coagulation.

The resin solution containing the suspended filler or pigment may be applied upon metals, porcelain, or other surface as an enamel by spraying, painting, dipping or other method and hardened by heat or used in any other known manner.

What we claim as new and desire to secure by Letters Patent of the United States, is:

1. The process of treating an alkyd resin which consists in dissolving said resin in an organic liquid solvent, bringing the resulting solution into contact with an alkali in solid, granular form, removing the products of the resulting reaction together with uncombined alkali and suspending basic mineral matter in the neutral solution thus obtained.

2. The process of treating a solution of a polyhydric alcohol-polybasic acid resin preparatory to suspending finely divided basic material therein which consists in treating said solution with granular alkaline-earth material to remove uncombined polybasic acid from said solution.

3. The process of treating an alkyd resin preparatory to forming a coating composition containing suspended alkaline material which consists in dissolving said resin in an organic solvent, bringing the resulting solution into contact with granular alkaline-earth material for a sufficient length of time to remove free acids, and separating solid constituents from the solution.

4. A coating composition comprising a solution of alkyd resin in an organic, nonaqueous solvent, and a finely-divided mineral material having alkaline properties suspended therein, said solution being deprived of acid constituents which would tend to cause coagulation.

In witness whereof, we have hereunto set our hands this 27th day of January, 1927.

ROY H. KIENLE.
LESTER V. ADAMS.